March 29, 1949.  H. N. LEWIN  2,465,734
DIE PRESS

Filed July 9, 1945  3 Sheets-Sheet 1

INVENTOR
HENRY N. LEWIN
by

March 29, 1949.  H. N. LEWIN  2,465,734
DIE PRESS
Filed July 9, 1945  3 Sheets-Sheet 2
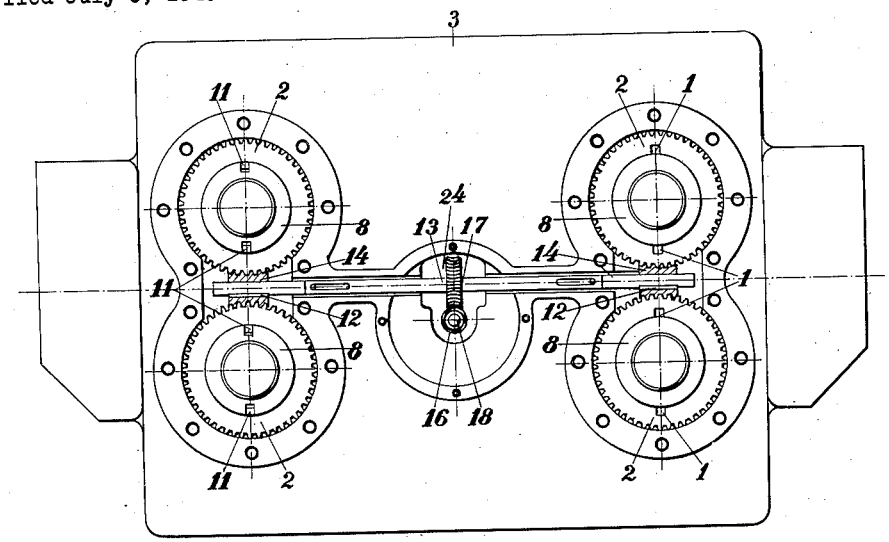
Fig. 3
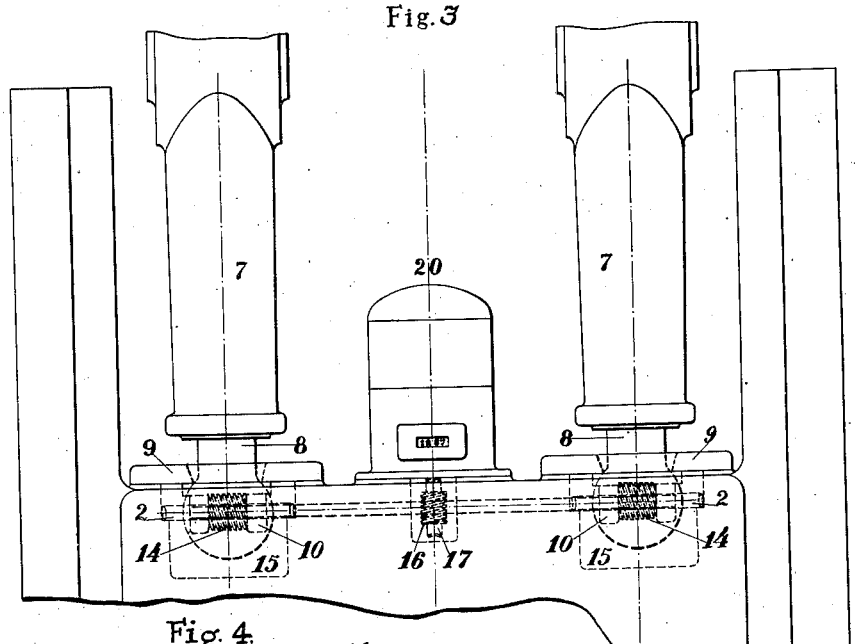
Fig. 4.
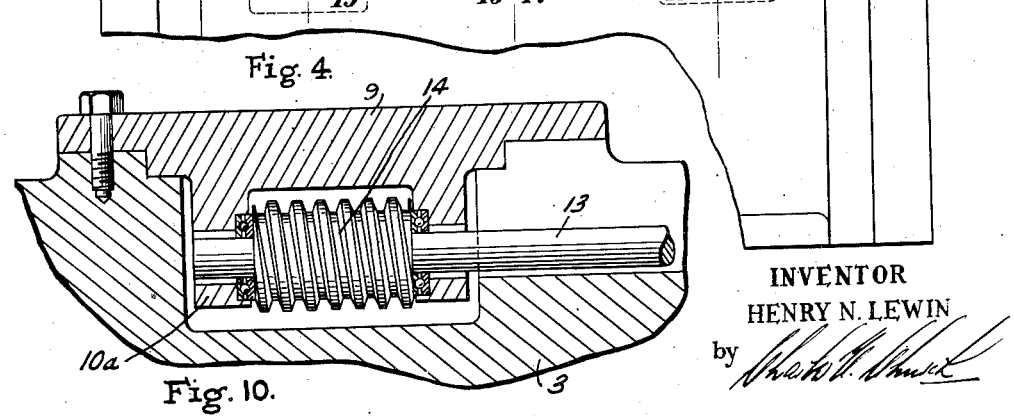
Fig. 10.
INVENTOR
HENRY N. LEWIN
by 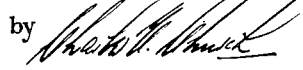

March 29, 1949. H. N. LEWIN 2,465,734
DIE PRESS
Filed July 9, 1945 3 Sheets-Sheet 3

INVENTOR
HENRY N. LEWIN
by

Patented Mar. 29, 1949

2,465,734

UNITED STATES PATENT OFFICE 2,465,734

DIE PRESS

Henry Naftaly Lewin, Hamilton, Ontario, Canada

Application July 9, 1945, Serial No. 603,916

22 Claims. (Cl. 74—586)

My invention relates to a device for adjusting the two extreme positions of the slide of a power press. It applies in particular to the case where this adjustment is accomplished by means of varying the theoretical length of the connecting rod, i. e. of the distance between the axis of the bearing of the said connecting rod and the center of the ball that terminates the connecting rod screw and transmits the pressure to the slide of the press. My device consists of a combination of gears of which the last one is driving the ball terminating the ball screw of the connecting rod. When there are several connecting rods, there is a last gear assembled on the ball of the screw terminating each connecting rod.

The objects of my invention are:

1. To make the adjustment of the two extreme positions of the slide of a power press and particularly of a heavy slide an easy, continuous and fast operation;

2. To provide the means for an easy, continuous and fast adjustment of the slide of a double or multiple crank press, using only the least possible number of component parts;

3. To provide for such adjustment of the slide a device which does not require the shortening of the connecting rod, thus allowing in the said rod ample space for a deep thread for the connecting rod screw;

4. To provide for such adjustment of the slide a device irreversible with respect to the ball screw, so as to have the said ball screw self locked after each adjustment, thereby preventing any damage or breaking of any part of the press ordinarily due to failure of the locking device in the connecting rod;

5. To provide for such adjustment of the slide a device which does not require the usual split or similarly shaped end of the connecting rod thus eliminating therein a highly objectionable zone of stress concentration;

6. To provide for such adjustment of the slide a mechanism particularly suitable to be driven by an electrical motor by means of the least possible number of component parts;

7. To provide for the said adjustment of the slide a mechanism particularly adaptable to being incorporated in the slide itself so as to have the whole of the said mechanism running in an oil bath and protected against any possibility of being injured accidentally or damaged and worn out rapidly by particles of dirt and grit always present around presses in operation;

8. To provide for the said adjustment of the slide, when applied to a double or multiple crank press, a mechanism permitting an easy and correct timing of the different ball screws in their respective connecting rods;

9. To provide for the said adjustment of the slide, when applied to a single crank press, a device particularly suitable to be driven by an electrical motor;

10. To provide for the said adjustment of the slide, when accomplished by means of an electrical motor, a mechanism of high and constant efficiency so as to be susceptible to be driven by a very small motor;

11. To provide for the said adjustment of the slide a device as light as possible so as not to increase to any appreciable degree the weight of the said slide, which increased weight would add to the difficulty of properly equilibrating the slide;

12. To provide for the said adjustment of the slide a device such as not to increase to any appreciable degree the inertia of the said slide, which increased inertia would require a larger motor for actuating the press;

13. To provide for the said adjustment of the slide a device particularly suitable to contain in itself as an integral part, a counting apparatus showing at any moment the position of the slide with reference to the bed of the press in thousandths of an inch, thus making the set-up of any die an easy, exact, controllable and recordable operation.

It has long been recognized that the existing devices for the adjustment of the length of the connecting rod in a press become quite unsatisfactory for a slide of any appreciable weight. The simplest of all such devices consists of a hexagon machined on the stem of the ball screw and situated between the thread and the ball. An ordinary wrench provides the means of turning the hexagon thus increasing or decreasing accordingly the theoretical length of the connecting rod. However, for a slide of any appreciable weight using such an adjustment becomes both tiresome and very slow, as it involves the handling of a very heavy wrench that acts only intermittently. Moreover, in order to provide between the end of the connecting rod proper and the top of the slide the space necessary for the above mentioned hexagon as well as for the manipulation of the big wrench, it becomes necessary to shorten quite considerably the length of the connecting rod proper. Thus the length available in the connecting rod for the thread for the ball screw is reduced correspondingly. Such shortening of the depth of the thread in the connecting rod is responsible for the widespread failures of the said rod which failures occur as the rod buckles, collapsing laterally.

In order to prevent, to a certain extent at least, such collapsing, it becomes indispensable to provide the connecting rod with some means of locking the ball screw after each adjustment. All such locking devices, however, have the common grave inconvenience of augmenting considerably the very danger which they are supposed to prevent. This occurs namely, when the operator forgets to lock the ball screw or when the said ball screw unlocks itself due to the continuous shocks and vibrations to which the press is submitted. All such locking devices have furthermore the grave common default of always involving in the design of the connecting rod a deep, narrow slit or a similar shape creating a highly objectionable zone of stress concentration. Moreover, if even a connecting rod were designed to be long enough to allow sufficient space for a deep thread for the ball screw, it would still be subject to buckling by collapsing laterally due to the unlocking of the said ball screw.

It is indeed a known fact that due to the vibrations of the press, the said ball screw, once unlocked, has a tendency to unscrew out of the connecting rod, thereby increasing its total length. The rod thus having its length increased results at first in excessive stresses in all the acting parts of the press and, if not noticed and corrected betimes, is bound to bring about the collapse of the connecting rod or, and still worse, may result in a broken crankshaft or even in a broken press frame.

A certain improvement is realised by using a ratchet device which makes the adjustment a little less tiresome. Apart from this, the devices with a ratchet present all the major inconveniences of the ordinary hexagon machined on the stem of the ball screw. Like the said hexagon device, it works but intermittently; it takes at least as much of the length of the connecting rod and it necessitates locking as well. In large, double or multiple crank presses, where the adjustment of the slide by means of a simple ratchet device would be impracticable, due to the great weight of the said slide, different gear combinations have been applied. Such gear combination devices, when motor driven, of course, reduce considerably the time necessary for the adjustment. They still present, however, all the other major inconveniences of the common hexagon device, to wit: (1) considerable shortening of the threaded part of the connecting rod; (2) necessity of locking the ball screw and (3) danger of breaking the connecting rod or even some still more important part of the press because of the ball screw being left unlocked or unlocking itself due to the vibrations of the machine in operation.

Such gear combination devices are furthermore greatly objectionable on the following specific accounts:

1. They are greatly subject to being injured by some object falling accidentally between the teeth of the gears and wear out rapidly due to the particles of dirt and grit which unavoidably accumulate in and around the gears;

2. For the reasons aforementioned, they have but a very low mechanical efficiency which in turn brings about the necessity of selecting a motor which would normally be far too strong for this purpose;

3. They are very heavy thus increasing quite appreciably the weight of the slide and thereby adding considerably to the difficulty of properly equilibrating the said slide, while by increasing the inertia of the slide, they require for actuating the press a motor larger than what would normally be necessary. Their great weight is mainly due to the rocking bridge on which all such devices must be assembled, to all their component parts being by necessity oversize and to the large motor which is necessary to drive them.

4. They are complicated and therefore very expensive;

5. They are very difficult, if possible at all, to apply in single crank presses with heavy slides where there is hardly any space available for this purpose.

All these inconveniences are eliminated in my invention. This fact, as well as other features, objects and advantages of my invention will appear from the following detail description of several preferred embodiments of the same.

In the accompanying drawings illustrating such embodiments:

Figure 1 is a detail elevation of the slide and the connecting rod of a power press, showing in a fragmentary section my adjustment device in two of its preferred embodiments. This elevation may represent the slide, the connecting rod and the crankshaft of a press equipped with my adjustment device so designed as to be operated manually. In this case, however, it must be understood that the connecting rod and the crankshaft assembled therewith have been turned 90° with reference to the normal position of the said parts. Figure 1 may also represent the slide, one of the connecting rods and the crankshaft of a double or triple crank press provided with my adjustment device. When representing parts of a double crank press, Figure 2 with its cross sectional views corresponds to a section taken on the plane of the line 2—2—2—2 of the Figure 2.

Figure 2 is a plan view of the slide of a double crank press provided with my adjustment device in two of its preferred embodiments designed to be driven by an electrical motor, the said slide being assembled with the two ball screws and the rest of the adjusting mechanism; the connecting rods proper, the connecting rod collars, the cover plates of the slide slots and the adjustment motor having been removed in order to show the mutual relation of the main driving parts of the adjustment mechanism.

Figure 3 is a plan view of the slide of a quadruple crank press provided with my adjustment device shown in two of its preferred embodiments such as designed to be driven by an electrical motor, the said slide being assembled with the four ball screws and the rest of the adjusting mechanism; the connecting rods proper, the connecting rod collars, the cover plates of the slide slots and the adjustment motor having been removed in order to show the mutual relation of the main parts of the adjustment mechanism.

Figure 4 is an elevation of the slide of a double crank press provided with one of the preferred embodiments of my invention such as designed to be driven by an electrical motor comprising in its frame an indicating device showing in thousandths of an inch the displacement of the said slide during the adjustment operation. Figure 4 corresponds to the plan view of the slide in an embodiment such as shown in Figure 3.

Figure 5 is a plan view of the slide of a heavy single crank press provided with my adjustment device in two of its preferred embodiments designed to be driven by an electrical motor, the said slide being assembled with the ball screw and the rest of the adjusting mechanism; the connecting rod proper, the connecting rod collar, and the adjustment motor having been removed to show the mutual relation of the main driving parts of the adjustment mechanism.

Figure 10 is a longitudinal cross-section taken through the axis of the worm shaft.

Figures 1, 2, 11:
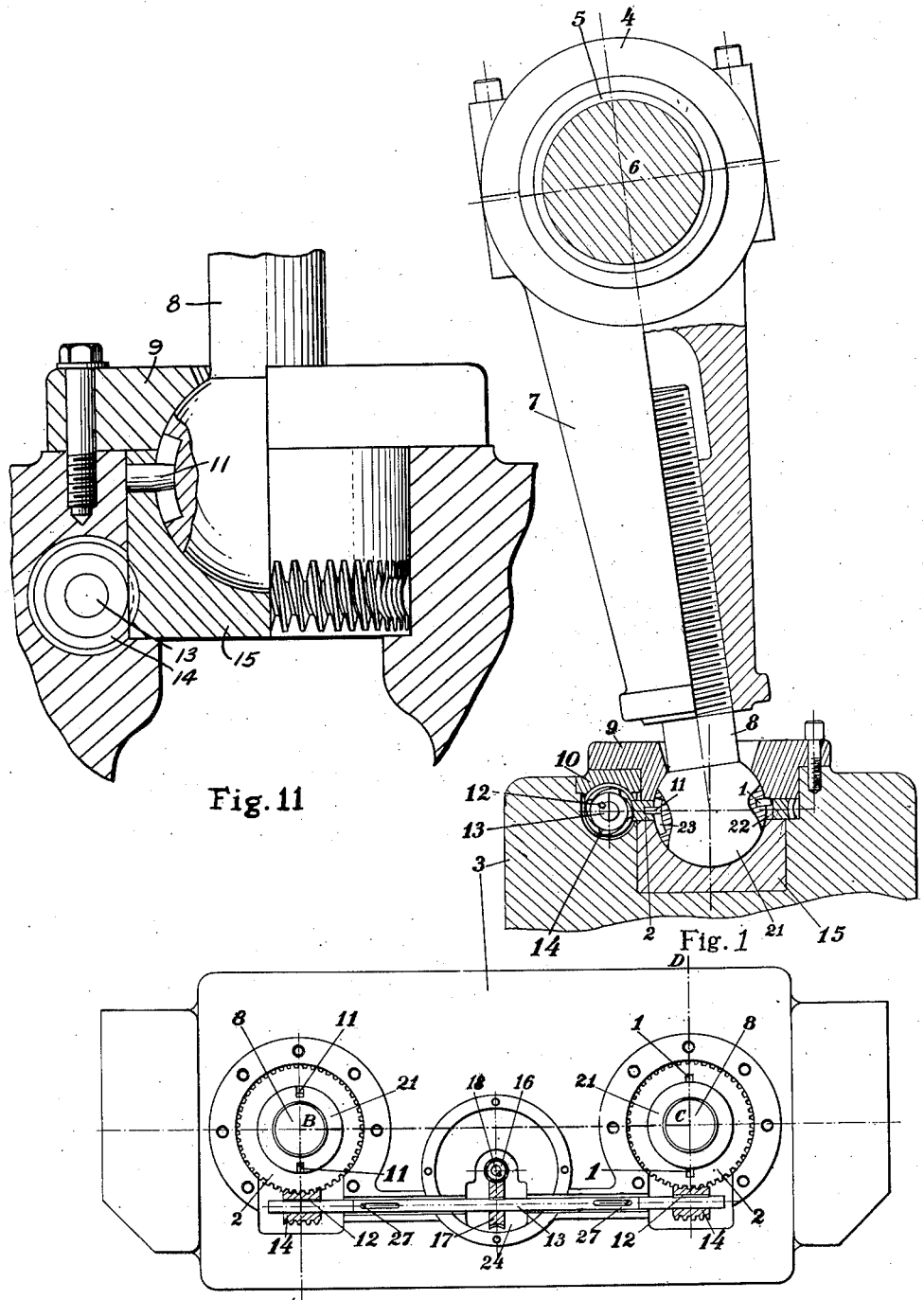
Figure 11 is a detail elevation of the slide and the connection rod of a power press, showing in a fragmentary section an alternative form of the invention.

In Figure 1 the crankshaft 6 actuates the slide 3 through the connecting rod 7; the split bronze bushing 5 is held in the said connecting rod by means of the removable cap 4 secured to the connecting rod proper by screws. The pressure is transmitted to the slide 3 by the ball 21 of the ball screw 8, the said ball 21 acting on the ball socket 15, inserted in the slide 3. The connecting rod collar 9, secured to the slide 3 by means of a number of screws for example, has a central opening presenting two distinct parts: (1) the lower part in shape of a portion of a concave sphere of a radius corresponding to the radius of the ball 21 and (2) the upper part in shape of a frustrum of a cone with its apex turned downwards. The lower base of the frustrum of the cone coinciding with the upper base of the portion of the concave sphere, has a diameter such as to allow the passage of the stem of the ball screw 8 but not of the ball 21 itself. The diameter of the upper base of the said frustrum of the cone is sufficiently larger than the diameter of its lower base to allow the free oscillation of the ball screw 8 corresponding to the stroke of the crank, while the surface of the spherical portion of the opening constitutes the upper seat of the ball 21. Thus the collar 9 causes the slide 3 to accompany the connecting rod 7 during the upward half of the latter's travel.

The connecting rods 7, the ball screws 8 and the ball sockets 15 also appear in Figure 4.

In Figure 1 the ball screw 8 has no hexagon machined on its stem. Thus the length of the connecting rod proper 7 can be increased by the length which would have been necessary for the said hexagon as well as to allow the handling of the wrench wherewith the said hexagon is turned; with the ball screw 8 completely screwed in the connecting rod 7, the distance between the lower end of the said connecting rod and the upper face of the connecting rod collar 9 is just sufficient to permit the oscillation of the connecting rod 7.

Figure 1 further shows the worm shaft 13 whereon the worm 14 is assembled by means of the key 12. By turning the shaft 13, the worm 14 drives the worm gear 2. The assembly of the ball 21 with the worm gear 2 is such as to allow the ball screw 8 to oscillate independently of the worm gear 2 with reference to any axis perpendicular to the longitudinal axis of the said ball screw 8 and passing through the center of the ball 21 itself; in the same time a rotation of the worm gear 2 with reference to its axis results necessarily in an identical rotation of the ball screw 8. In other words the ball 21 is assembled with the gear 2 in a way such as to allow the said gear 2 to remain in its position between the lower face of the connecting rod collar 9 and the upper face of the ball socket 15 while permitting free oscillation of the ball screw 8 with reference to any diameter of the ball 21 perpendicular to the longitudinal axis of the ball screw itself.

This unique feature is due to the coincidence of the center of oscillation of the gear 2 with the center of the ball 21 and permits the driving of the ball screw 8 by means of gears which do not have to participate in the oscillating motion of the said ball screw 8. It can be accomplished in several ways all of which ways involve the possibility for the ball 21 of oscillating about two of its diameters perpendicular to each other and situated in a plane perpendicular to the longitudinal axis of the ball screw 8.

Two of such embodiments are shown in Figures 1, 2 and 3. In the embodiment shown in the right half of Figures 1, 2 and 3 respectively, the gear 2 has two slots 22 cut in it, the said slots being diametrally opposite. On the other hand two pins 1 are inserted in the ball 21, the common geometrical axis of the said pins 1 coinciding with a diameter of the ball 21 perpendicular to the axis of the ball screw 8. The gear 2 is assembled over the ball 21, with the pins 1 penetrating into the slots 22 of the gear 2. When the ball screw 8 oscillates with reference to the common axis of the pins 1, the said pins remain in their respective position with reference to the gear 2, while revolving about their own axis. When the ball screw oscillates about a diameter of the ball 21 perpendicular to the common geometrical axis of the pins 1, the said pins travel in the corresponding slots 22 of the gear 2. The length of the travel of the pins 1 is obviously limited by the thickness of the gear 2 as the said gear is contained between the connecting rod collar 9 and the ball socket 15. This implies a corresponding limitation of the amplitude of the oscillation of the ball screw 8. Where an amplitude of the latter oscillation greater than what would be allowed by a given thickness of the gear 2 is necessary or desirable, the embodiment shown in the left half of Figures 1, 2, and 3 can be used to advantange. The two said embodiments could, of course, be applied simultaneously, as the aforementioned Figures 1, 2, and 3 illustrate.

In the second embodiment it is the gear 2 that has inserted in it the two pins 11, the common geometrical axis of the said pins coinciding with a diameter of the said gear 2. The ball 21 presents here two diametrally opposite slots 23, having a common axial plane passing through the longitudinal axis of the ball screw 8, the said slots having preferably an equal depth over all their length. The gear 2 is assembled over the ball 21 with the pins 11 penetrating into the slots 23 of the ball. Thus the ball screw can freely oscillate with reference to its own diameter constituting the common axis of the two pins 11, with the lateral walls of the two slots 23 being constantly in contact with the pins 11. When the ball screw 8 oscillates with reference to the diameter of the ball 21 perpendicular to the plane of the two slots 23 cut in it, the pins 11 travel accordingly in the said slots of the ball 21. Thus the thickness of the gear 2 presents no limitation to the amplitude of oscillation of the ball screw 8, as the two slots 23 can be cut accordingly to the said amplitude.

The ball socket 15 and the gear 2 could, of course, be designed as one single part performing simultaneously the roles of both the ball socket 15 and the gear 2 as illustrated in Figures 10 and 11. For this purpose the ball socket 15 would have to be provided for example, with teeth and pins such as would otherwise have been made in the gear 2.

Figure 10 is a longitudinal cross-section taken through the axis of the worm shaft 13. It shows the connecting rod collar 9 carrying, integral with it, the two lugs 10a containing the radial and thrust bearings of the worm shaft 13. It can be readily seen that making the worm housing integral with the connecting rod collar 9 suppresses the necessity of the machined seat in the slide 3 locating the housing 10.

Figure 11 is analogous to Figure 1. It shows the worm gear teeth cut on the periphery of the ball socket 15, receiving the ball screw 8. It also shows the worm 14, driving the ball socket 15 and thus turning the ball screw 8 by means of the pins 11, protruding into the slots of the ball. It can be readily seen that with the teeth cut into the ball socket 15 the latter plays at the same time the role of the worm gear 2, as shown in Figure 1 which results in the possibility of suppressing the worm gear 2 altogther.

In all of such embodiments the combination of the aforementioned two oscillations results in an oscillation about any diameter of the ball 21 perpendicular to the axis of the ball screw 8, while the rotation of the gear 2 causes an equal rotation of the ball screw 8.

Figure 6:
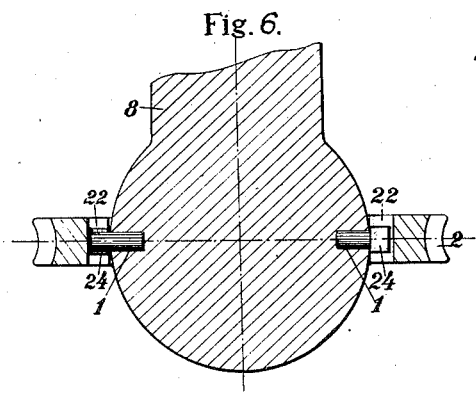
Figure 6 is an enlarged fragmentary elevation showing the detail of a longitudinal section made through the geometrical axis of the ball screw such as comprised in one of the preferred embodiments of my invention.

Small blocks 24, shown in detail in Figure 6, sliding respectively in the two slots 22 of gear 2 in one of the preferred embodiments of the invention can be assembled on the pins 1 so as to prevent the possibility of the pins being worn out prematurely by friction in their linear contact with the lateral walls of the slots 22.

Figure 7:
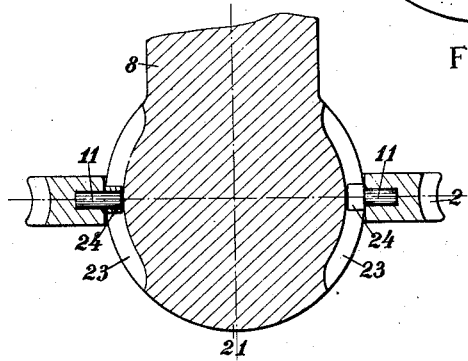
Figure 7 is an enlarged fragmentary elevation showing the detail of a longitudinal section made through the geometrical axis of the ball screw in another of the preferred embodiments of my invention.

In Figure 7 the blocks 24 are similarly assembled on the pins 11 and slide in the slots 23 of the ball 21.

Figures 1 and 4 show the housings 10 wherein the end worms 14 turn, their shaft 13 being supported in the housings in adequate radial and thrust bearings. The housings 10 can, of course, be designed so as to constitute an integral part of the connecting rod collars 9.

When the invention applies to a hand driven device for adjustment of the slide of single crank press, the shaft 13 presents a handle assembled on its free end protruding out of the slide for this purpose.

When the invention is applied as an adjustment device for a double or multiple crank press, the shaft 13 becomes the common driving shaft for the different gears (or worms) 14 of which each drives a last gear 2 assembled on the ball 21 of the corresponding ball screw 8.

In Figure 3 is shown the unique feature whereby each of the end worms 14 drives simultaneously two of the worm gears 2.

In Figures 2, 3, and 4 the worm 16, assembled on the shaft 18, drives the shaft 13 by means of the worm gear 17 assembled on the said shaft 13. When the invention applies to an adjustment device driven by a motor, the shaft 18 is coupled directly with the shaft of the said motor 20. The housings wherein the worm 16 is assembled on the shaft 18 as well as the worm gear 17 is assembled on the central part of the shaft 13, the said shafts 13 and 18 being supported in their respective housings in adequate radial and thrust bearings, can, of course, be designed so as to constitute an integral part of the housing of the motor 20, thereby permitting the cavity 24 in the slide 3 wherein the said worms, worm gears and their respective shafts are enclosed, to be used as cast, without necessitating any machining operation whatsover.

One or several sets of worms and worm gears such as 2 and 14 or 16 and 17 respectively, which are included in each of the embodiments of my invention, present a helix angle small enough to make the said set or sets irreversible. Thus the necessity of a special locking device for the ball screw 8 in the connecting rod 7 is suppressed completely, as well as the possibility of the said ball screw to unlock itself due to the vibrations of the press in operation.

Figure 5:
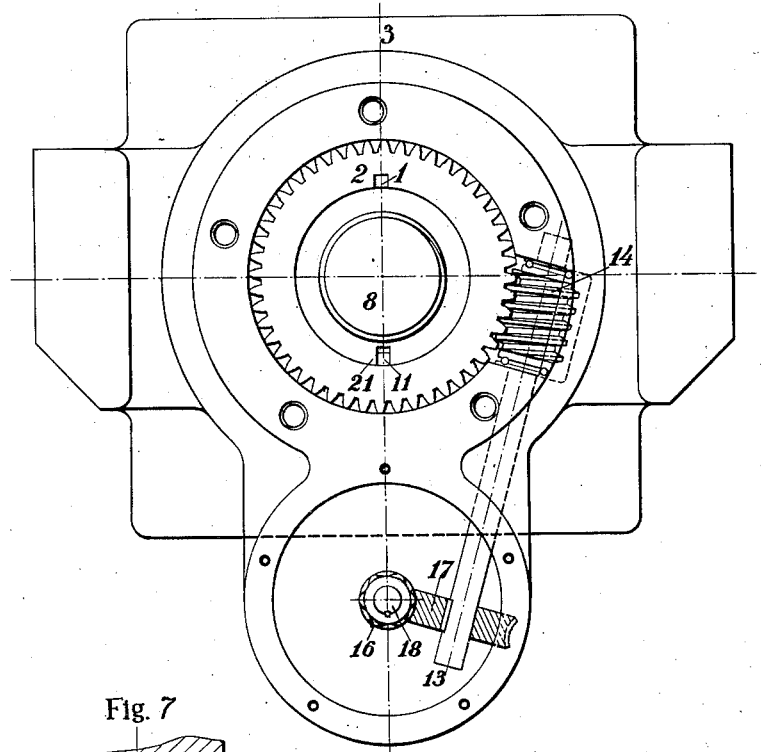

In Figure 5 the shaft 13 is shown with its axis inclined with reference to the median plane of the slide. This makes it possible to have the adjustment device driven by an electrical motor situated in said median plane of the slide and with the minimum component parts being necessary for the transmission.

Figure 8:
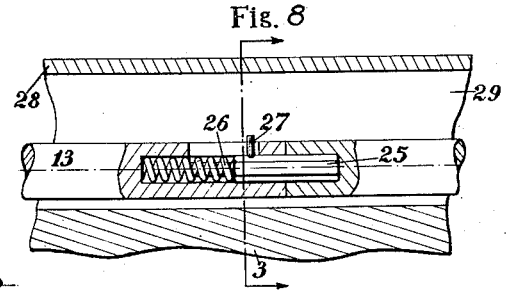
Figure 8 is an enlarged fragmentary sectional elevation showing the detail of a preferred embodiment of the timing device indispensable for the correct assembly of the ball screws in a double or multiple crank press.

In Figure 8 both the terminal part and the central part of the shaft 13 are shown provided each with a central cavity having the shape of a hexagonal prism, the cavity in the central part of the shaft 13 being longer than the corresponding cavity in the terminal part of the said shaft. A slot in the wall of the central part of the shaft 13 communicates with the aforementioned cavity in it. A pin 25 in shape of a hexagonal prism is assembled with a sliding fit in the cavity of the central part of the shaft 13 with a helical spring 26 between the bottom of the said cavity and the hind end of the pin 25. The spring 26 can be compressed by pushing the pin 25 deep enough into the said cavity as to have the front end of the pin flush with the opening of the cavity. Thus it becomes possible to rotate the two gears 14 independently of each other at the assembly of the device so as to obtain the means of assuring the equality of the theoretical length of the different connecting rods 7. When this is accomplished, the pin 25, by penetrating into the cavity of the terminal part of the shaft 13 under the action of the spring 26, connects the two parts of the said shaft 13 in one of the six possible angular positions to each other. The pin 25 can be pushed into the cavity of the central part of the shaft 13 by means of the finger 27, sliding in the slot in the wall of the said central part of the shaft 13.

Figure 9:
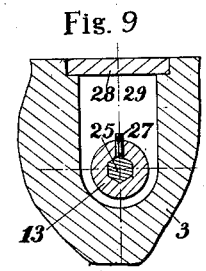
Figure 9 is an enlarged fragmentary elevation showing a cross section taken on line AB in Figure 8.

In Figure 9 the cover plate 28 is shown closing the slide slot 29 containing the shaft 13.

As will be seen from the above detail description of my invention, each of its embodiments as applied to the different practical cases, has been realised using only the minimum possible number of component parts. Thus it has been possible to successfully realise an adjustment device for a slide of a heavy duty double crank press for example using an adjustment motor of ¾ H. P. only instead of 7½ to 10 H. P. which would have to be used for an adjustment device of any conventional design for a press of this type and size.

While I have illustrated and described what I regard to be some of the preferred embodiments of my invention, it will nevertheless be understood that these are merely examplary and that numerous modifications and rearrangements may be made therein without departing from the essence of the invention. Neither is my invention limited in its utility to power presses, but has application to press brakes and similar machines as well.

What I claim as my invention is:

1. In a mechanism of the character described, a crank, a slide, a pitman carried by the crank and having a threaded bore, a rod extending from the slide and screwed into the pitman bore, a spherical ball carried upon the protruding end of the rod and oscillatably contained within a socket in the slide, and means carried by the slide for turning the ball in the socket and screwing the rod in the pitman bore to adjust the distance between the crank and the slide.

2. A device as claimed in claim 1, wherein the adjustment means carried by the slide comprises a ring gear embedded within the wall of the socket, means for rotating the ring, and coupling means extending between the ring and the ball whereby rotation of the ring rotates the ball.

3. A device as claimed in claim 1, wherein the adjustment means carried by the slide comprises a ring gear embedded within the wall of the socket, means for rotating the ring, and a pin extending between the ball and the ring so that rotation of the ring rotates the ball, one end of the pin being anchored and the other end of the pin being slidably contained within a slot.

4. A device as claimed in claim 1 wherein the adjustment means carried by the slide comprises a ring gear embedded within the wall of the socket, a worm engaging the ring gear, means for rotating the worm, and a pin extending from the inner face of the ring gear into a slot in the ball whereby rotation of the ring rotates the ball, the pin-containing slot being of sufficient length to permit oscillation of the ball in the socket.

5. A device as claimed in claim 1 wherein the adjustment means carried by the slide comprises a ring gear embedded within the wall of the socket, a worm engaging the ring gear, means for rotating the worm, a pin extending from the inner face of the ring, and a block carried upon the pin and slidably contained within a slot in the ball whereby rotation of the ring rotates the ball, the slot being of sufficient length to permit oscillation of the ball in the socket.

6. In a mechanism of the character described, a plurality of cranks, a slide, a plurality of pitmans carried by the cranks and having threaded bores, rods extending from the slide and screwed into the pitman bores, spherical balls carried upon the protruding ends of the rods and oscillatably contained within sockets in the slide, ring gears embedded within the walls of the sockets, a pin extending between each ball and its surrounding ring gear whereby rotation of the ring gear rotates the socket, a drive shaft, a worm mounted on the shaft and engaging the ring gears, and a shaft rotating motor mounted upon the slide.

7. In a device for the adjustment of the slide of a power press having a connecting rod with a ball screw threaded therein, a collar on said connecting rod, the combination therewith of a ring gear mounted in the slide and surrounding the ball screw of the connecting rod, said ball screw being capable of oscillation independent of said ring gear about any diameter of the ball perpendicular to the axis of the ball screw, said gear being in operative engagement with said ball whereby rotation of said gear effects rotation of the ball, said ring gear being situated between the upper face of the ball socket and the lower face of the connecting rod collar.

8. In a device for the adjustment of the slide of a power press having a connecting rod with a ball screw threaded therein, a collar on said connecting rod, the combination therewith of a ring gear mounted in the slide and surrounding the ball screw of the connecting rod, a plurality of slots provided in an axial plane of said gear, and a plurality of pins extending from the ball, the axis of the pins coinciding with a diameter of the ball perpendicular to the axis of the ball screw, the said pins penetrating into the slots respectively, a rotation of the gear thus resulting in an identical rotation of the ball screw while permitting free oscillation of the ball screw about any diameter of the ball perpendicular to the axis of the said ball screw, the said gear being situated between the upper face of the ball socket and the lower face of the connecting rod collar.

9. In a device for the adjustment of the slide of a power press having a connecting rod with a ball screw threaded therein, a collar on said connecting rod, the combination therewith of a ring gear mounted in the slide and surrounding the ball screw of the connecting rod, said ball provided with a plurality of slots situated in an axial plane of the ball screw, and a plurality of pins diametrally inserted in the said gear so as to be perpendicular to the axis of the gear, the said pins penetrating into the corresponding slots of the ball, the ring gear being situated between the upper face of the ball socket and the lower face of the connecting rod collar; rotation of the gear resulting in an identical rotation of the ball screw while permitting free oscillation of the ball screw about any diameter of the ball perpendicular to the axis of the ball screw.

10. In a device for the adjustment of the slide of a power press having connecting rods with ball screws threaded therein, the combination therewith of ring gears located in the slide and surrounding said balls, said ring gears being in operative engagement with and capable of rotating said balls, coupling means between said balls and said gears whereby the latter are capable of independent oscillation about any diameter of the ball perpendicular to the axis of the ball screws, means to rotate said ring gears, comprising driving pinions engaging the ring gears and mounted on common drive shafts, said drive shafts coupled to a vertical shaft, said vertical shaft connected to a driving means.

11. In the invention in claim 10, wherein the ring gear has worm teeth and is driven by a mating worm pinion, the helix of the worm pinion being such as to make the set irreversible and preventing accidental movement of the ball screw in the connecting rod during operation of the press.

12. In the invention in claim 10, a shaft inclined with reference to the plane of symmetry of the press, said inclined shaft being coupled to a vertical shaft extending out of the slide and coupled directly to driving means.

13. In the invention disclosed in claim 10, a multi-part common driving shaft, said parts connected to each other by means of a coupling permitting the proper mutual relationship of the individual parts.

14. In the invention disclosed in claim 10, wherein the common driving shaft is multi-part, the parts coupled to each other by means of a prismatical coupling element sliding in corresponding cavities in the adjacent ends of the said parts, and springs holding the said prismatical elements in their selected position.

15. In the invention disclosed by claim 10, wherein the pinions are of the worm type and actuate simultaneously two worm ring gears, said worms being located in the slide between said ring gears.

16. In a device for the adjustment of the slide of power press having connecting rods, collars on the lower ends of said connecting rods with ball screws threaded therein, the combination therewith of ring gears located in the slide and surrounding said balls, said ring gears being in operative engagement with and capable of rotating said balls, coupling means between said balls and said gears whereby the gears are capable of independent oscillation about any diameter of the ball perpendicular to the axis of the ball screws, means to rotate said ring gears, comprising driving pinions engaging the ring gears and mounted on common drive shafts, said drive shafts coupled to a vertical shaft, said vertical shaft connected to a motor, said motor having a housing.

17. In the invention disclosed in claim 16 wherein the motor housing has pendant from the lower face thereof and integral therewith the bearings of the vertical shaft element.

18. In the invention disclosed in claim 16 wherein the motor housing contains integral therewith apparatus to indicate the position of slide with reference to the bed of the press at any moment of operation.

19. In the invention disclosed in claim 16 wherein the connecting rod collar carries on its lower face and integral therewith the housing containing the bearings of the shaft carrying the driving pinions.

20. In a device for the adjustment of the slide of a power press having a connecting rod with a ball screw threaded therein, a collar on said connecting rod, the ball of the ball screw seated in a symmetrical socket in the slide, the combination therewith of gear teeth formed integrally with the wall of the socket, means operatively engaging said teeth to turn said socket about said ball, coupling means between said socket and said ball whereby rotation of said socket causes identical rotation of said ball.

21. In a mechanism of the character described, a crank, a slide, a pitman carried by the crank and having a threaded bore, a rod extending from the slide and screwed into the pitman bore, and means entirely carried by the slide for turning the rod with respect to the pitman and slide to adjust the distance between the crank and the slide.

22. In a mechanism of the character described, a crank, a slide, a pitman connected to said crank, a rod having a spherical ball on one end thereof, a threaded connection between said rod and said pitman, a member mounted in said slide to turn about an axis parallel to the direction of movement of the slide, means operatively connecting said member to said ball to cause said ball to turn with said member about such axis while permitting said ball to oscillate with respect to said member, and means carried by said slide to turn said member.

HENRY NAFTALY LEWIN.

REFERENCES CITED

The following references are of record in the file of this patent:

UNITED STATES PATENTS

| Number | Name | Date |
| --- | --- | --- |
| 769,955 | Osswald | Sept. 13, 1904 |
| 1,298,234 | Lowther | Mar. 25, 1919 |
| 1,743,596 | Cammack | Jan. 14, 1930 |
| 1,788,071 | Strout | Jan. 6, 1931 |
| 1,817,885 | Byerlein | Aug. 4, 1931 |
| 2,185,096 | Treer | Dec. 26, 1939 |
| 2,355,556 | Peterson | Aug. 8, 1944 |